United States Patent [19]

Gebhart

[11] Patent Number: 4,856,637
[45] Date of Patent: Aug. 15, 1989

[54] CENTRIFUGAL CONE CLUTCH
[75] Inventor: Gary R. Gebhart, Arcadia, Calif.
[73] Assignee: Horstman Manufacturing Co., Monrovia, Calif.
[21] Appl. No.: 223,414
[22] Filed: Jul. 25, 1988
[51] Int. Cl.[4] ............................................. F16D 43/10
[52] U.S. Cl. .............................. 192/105 C; 192/103 A
[58] Field of Search ............ 192/103 A, 105 C, 111 R

[56] References Cited

U.S. PATENT DOCUMENTS

| 586,832 | 7/1897 | Bardons et al. | 192/66 |
|---|---|---|---|
| 1,122,206 | 12/1914 | Jennings | 192/66 |
| 1,141,648 | 6/1915 | Mitchella | 192/112 |
| 1,248,110 | 11/1917 | Heaney | 192/111 R |
| 1,922,931 | 8/1933 | Defays et al. | 192/105 |
| 1,926,783 | 9/1933 | Miller | 192/105 C |
| 2,001,931 | 5/1935 | Lyman | 192/103 A |
| 2,012,509 | 8/1927 | Hoddy | 172/120 |
| 2,054,479 | 9/1936 | Hoddy | 192/0.02 |
| 2,116,739 | 5/1938 | Eason | 192/111 R |
| 3,294,209 | 12/1966 | Kachman et al. | 192/66 |
| 3,750,788 | 8/1973 | Heinemann | 192/107 R |
| 4,111,291 | 9/1978 | Horstman | 192/105 C |
| 4,576,269 | 3/1986 | Hamane et al. | 192/103 A |
| 4,732,251 | 3/1988 | Tipton | 192/105 C |

Primary Examiner—Rodney H. Bonck
Assistant Examiner—Nicholas Whitelaw

[57] ABSTRACT

The centrifugal friction clutch has a pressure plate with an exterior frusto-conical friction surface, a pressure drum with a corresponding frusto-conical pressure receiving surface, and a plurality of centrifugal force levers mounted on a support member, adapted to bias the conical surface of the pressure plate against the pressure drum at a predetermined speed of rotation, due to centrifugal force exerted on the force levers. Stall speed screws adjust the speed of rotation at which the centrifugal force levers will force the pressure plate into engagement with the pressure drum, and drive torque is transmitted from the clutch by a sprocket attached to the pressure drum. The frusto-conical shape of the pressure plate and pressure drum provide a greater mechanical advantage for applying the force of engagement of the clutch, permitting a reduction in size and weight of the elements required for providing frictional surfaces.

7 Claims, 3 Drawing Sheets

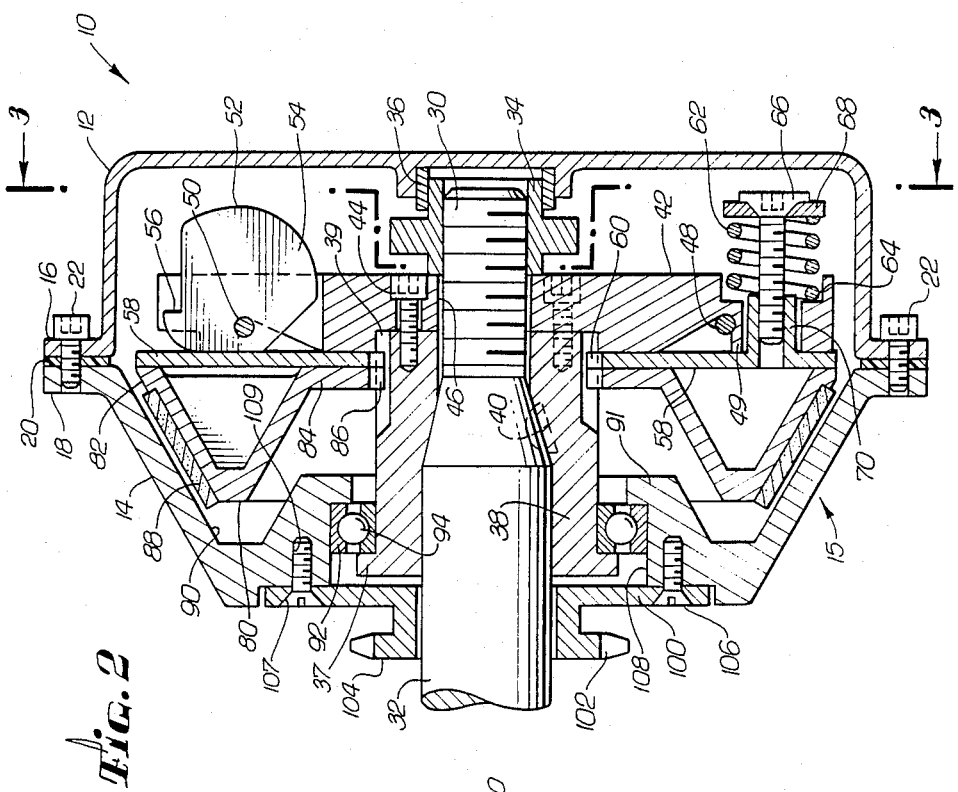

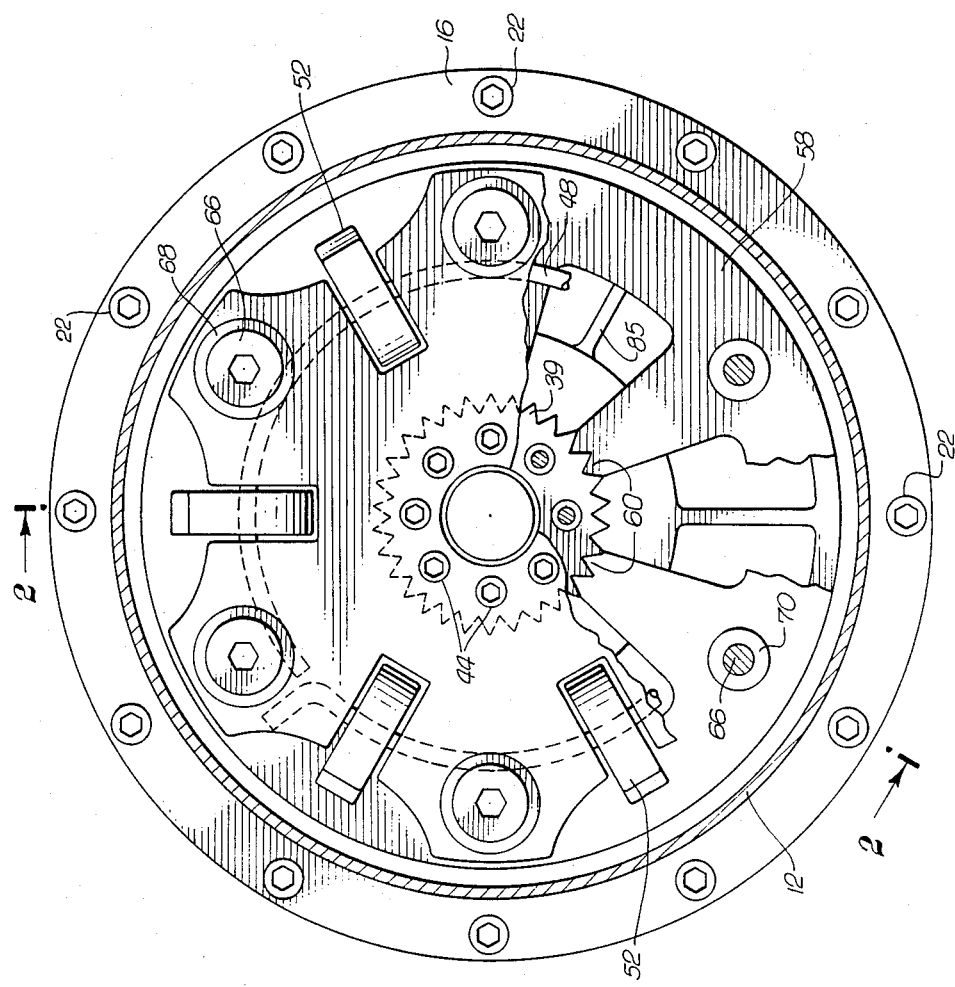

CENTRIFUGAL CONE CLUTCH

BACKGROUND OF THE INVENTION

1. Field of the Invention:

This invention relates generally to friction clutches, and more particularly relates to centrifugal clutches in which the frictional elements engage at a predetemined speed of rotation of a power shaft.

2. Prior Art:

Centrifugal friction clutches which engage at a predetermined rotational speed are particularly useful in combination with internal combustion engines which tend to stall under starting load conditions by delaying engagement until the engine is operating at a sufficiently high speed to produce enough torque to prevent stalling. Such centrifugal friction clutches are also particularly useful in connection with small displacement internal combustion engines such as are used in go-carts. One such centrifugal clutch is described in U.S. Pat. No. 4,111,291, and includes a number of plates and discs which move into frictional engagement by pressure exerted by pivoting of weights arranged next to the plates and discs. A demanding application of such a clutch is in racing go-carts, in which any unnecessary size and weight can be a disadvantage. Centrifugal clutches are also known in automatic multispeed transmissions, such as are discussed in U.S. Pat. No. 4,576,269; but such transmissions add a considerable amount of size and weight to a small vehicle, and go-carts or one-quarter midget racing vehicles typically are not equipped with transmissions. It is therefore necessary for the clutch to be continually engaged and disengaged, and it is desirable that the clutch should engage and disengage smoothly, and at approximately at the same speeds. It would be desirable to provide a centrifugal cone clutch with improved mechanical advantage for greater efficiency, compactness and a lighter weight, with a means of adjusting the optimum settings for the speed of engagement and disengagement of the clutch. Furthermore, it would be desirable to provide a centrifugal friction clutch with a reduced friction surface, in order to save in size and weight of the clutch. The present invention meets these needs.

SUMMARY OF THE INVENTION

The present invention provides for a centrifugal friction clutch having a pressure plate with an exterior frusto-conical friction surface, a pressure drum with a corresponding frusto-conical pressure receiving surface, and a plurality of centrifugal force levers mounted on a support member, adapted to bias the conical surface of the pressure plate against the pressure drum at a predetermined speed of rotation, due to centrifugal force exerted on the force levers. Stall speed screws adjust the speed of rotation at which the centrifugal force levers will force the pressure plate into engagement with the pressure drum, and drive torque is transmitted from the clutch by a sprocket attached to the pressure drum. The frusto-conical shape of the pressure plate and pressure drum provide a greater mechanical advantage for applying the force of engagement of the clutch, permitting a reduction in size and weight of the elements required for providing frictional surfaces.

Briefly and in general terms, the centrifugal friction clutch according to the invention, for use in a vehicle, comprises a pressure plate having a peripheral frusto-conical pressure application surface, a pressure drum having a frusto-conical cavity with a peripheral pressure receiving surface for frictionally engaging the pressure application surface, a centrifugal force lever support engaged with the engine of the vehicle, and a plurality of centrifugal force levers mounted on the support member, with each of the levers having a radius portion, a weighted portion, and a pivotal point of attachment to the support member, each lever being adapted to bias the pressure application surface towards the pressure drum due to the influence of centrifugal force on the levers during rotation of the support member.

In a preferred embodiment, means are also provided for applying an adjustable biasing force on the support member toward the pressure plate, in order to adjust the biasing force of the centrifugal force levers due to centrifugal force. The support member preferably includes a number of apertures, and a corresponding number of threaded stems project axially through the apertures from the pressure plate or an intermediate contact plate, with compression springs extending between the support member and retaining screws in the threaded stems.

In one preferred embodiment, the centrifugal force levers press upon a contact plate intermediate to the pressure plate member bearing on the frusto-conical friction surface.

Other aspects and advantages of the invention will become apparent from the following detailed description, and the accompanying drawings, illustrating by way of example the features of the invention.

BRIEF DESCRIPTION OF THE DRAWINGS

FIG. 1 is a perspective view of the centrifugal clutch of the invention, separated from a power takeoff shaft from an engine of a vehicle;

FIG. 2 is an elevational section view taken along line 2—2 of FIG. 1;

FIG. 3 is a plan section of the clutch of the invention taken 3—3 of FIG. 2.

DETAILED DESCRIPTION OF THE INVENTION

Figure 4:
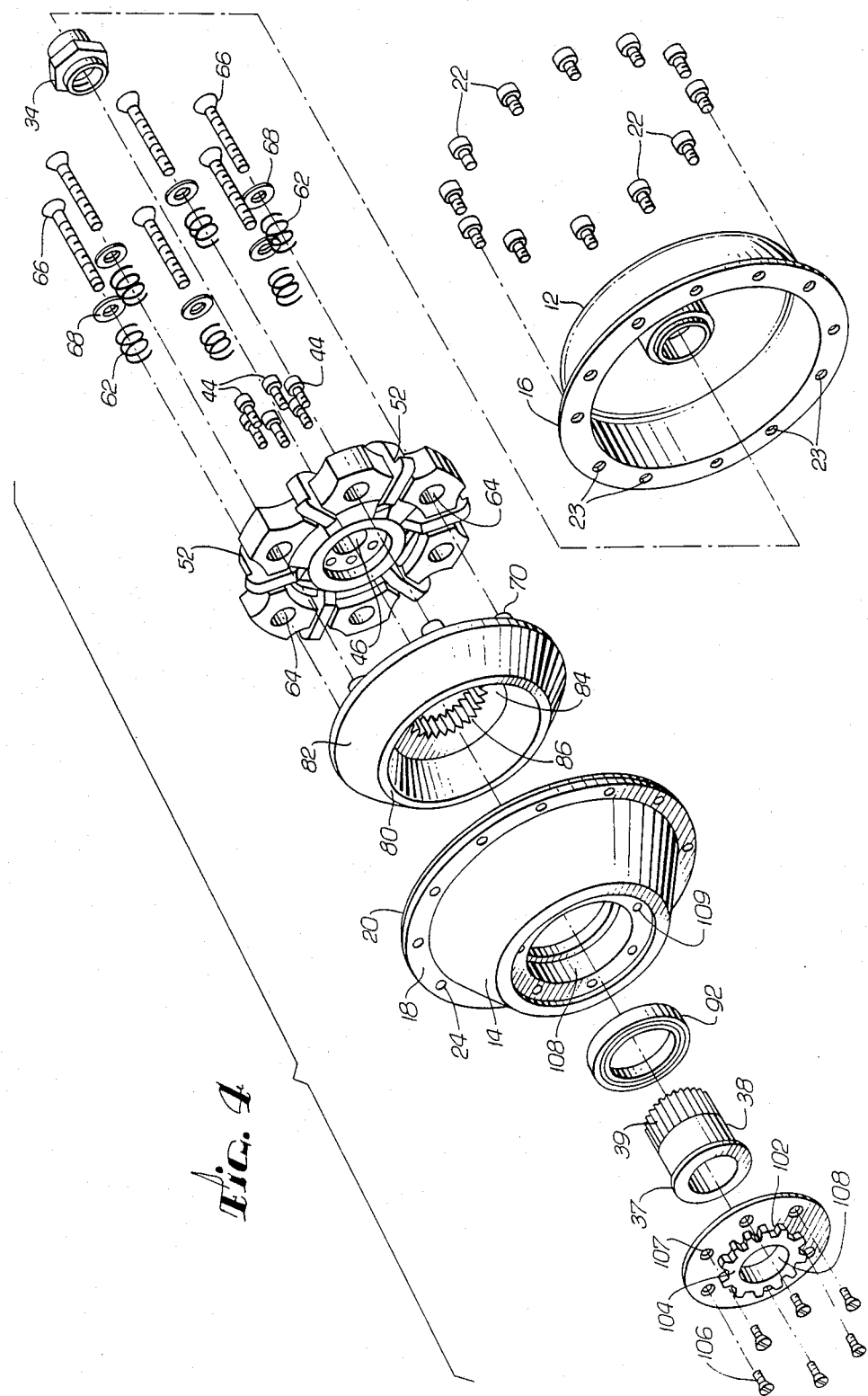
FIG. 4 is an exploded view of the clutch.

As is shown in the drawings for purposes of illustration, the invention is embodied in a centrifugal cone clutch assembly for use in combination with an engine of a vehicle, for transmitting torque for a rotating power shaft to a power output connector, the clutch frictional surfaces adapted to be engaged at a predetermined speed of engagement. The pressure plate of the clutch has a peripheral frusto-conical pressure application surface, and the pressure drum has a corresponding frusto-conical cavity with a peripheral pressure receiving surface adapted to frictionally engage the pressure application surface. A centrifugal force lever support lever is mounted to one or both of the plate member and the pressure drum, and includes a plurality of centrifugal force levers pivotally attached to the support member, each centrifugal force lever having a radius portion adapted to bias the pressure plate against a pressure drum under the influence of centrifugal force due to rotation of the centrifugal force lever support member.

In accordance with the invention, there is provided a centrifugal friction clutch for transmission of torque from a rotating input connector means for supplying rotational power to an output connector means for receiving said rotational power, and having frictional surfaces adapted to be engaged at a predetermined engagement speed of rotation of said input connector means, comprising a pressure plate means having a peripheral frusto-conical pressure application surface; a pressure drum having a frusto-conical cavity having a peripheral pressure receiving surface adapted to frictionally engage the pressure application surface; a centrifugal force lever support member operatively engaged with the input connector means; a plurality of centrifugal force levers symmetrically pivotally attached to the support member, each of the levers having a radius portion, a weighted portion and a pivotal point of attachment to the support member, each radius portion being adapted to bias the pressure application surface towards the pressure drum pressure receiving surface due to centrifugal force exerted on the levers during rotation of the support member.

As is shown in the drawings, the present invention provides for a centrifugal cone clutch which is particularly useful in combination with small internal combustion engines having from two to eighty horsepower, and specifically for small racing vehicles, such as go-carts and one-quarter midgets. The clutch 10 is contained in a generally cylindrical cover 12 and frusto-conically shaped drum 14, which when joined together provide the housing 15 of the clutch. The cover includes a peripheral flange 16, adapted to meet in corresponding engagement with a peripheral flange 18 of the drum, with a resilient annular seal 20 provided between the two flanges, which can be firmly secured together by a bolt 22 extending through holes in the color flange 23 and holes in the drum flange 24, so that the housing may be sealed and filled with oil, if desired.

As is illustrated in FIG. 2, in the preferred embodiment the threaded portion 30 of a power takeoff shaft 32 receives an internally threaded ground nut 34, which is in turn further mounted within the needle bearing 36 of the cylindrical cover. The main hub 38 conforms to and fits over the configuration of the power takeoff shaft, and includes an annular exterior flange 37 at one end and splines 39 arranged extending radially outward from the cylindrical surface of the hub at the other end of the hub. A keyway 40 is provided in the hub and the power takeoff shaft for alignment of hub on the shaft. A generally circular centrifugal force lever support plate is mounted to the splined end of the hub by the ground nut on the power takeoff shaft, but may also be further secured to the hub by a plurality of screws, such as socket head drive screws 44. The centrifugal force lever support member is preferably formed from cast aluminum, and has a central opening 46, allowing the threaded portion of the power takeoff shaft to pass therethrough, with a small amount of clearance.

An annular snap ring 48 is secured to the support member by snap fit expansion of the ring within an annular interior flange 49 of the support member, retaining the ring in position on the support member.

A plurality of centrifugal force levers 42 are arranged symmetrically about the centrifugal force lever support member, and contain an aperture 50 for threading each of the centrifugal force levers onto the snap ring. The centrifugal force levers are each preferably made of a plurality of flat parallel stamping or leaves arranged perpendicular to the direction of the snap ring, and include a drive portion 54 generally to one side of the aperture, having the major portion of mass of the force lever, and a radius 56 or cam portion generally on the other side of the aperture, so that as the support member rotates, the centrifugal force of the drive portion of the force levers urges the radius against a generally flat, circular contact plate 58. The contact plate includes a central opening with a plurality of radially inwardly extending splines 60, adapted to engaged the corresponding splines of the main hub.

A plurality of compression springs 62 are placed in countersunk openings 64 in the centrifugal force lever support member, held in place by a combination of stall speed adjusting screws 66 and washers 68, screwed in corresponding internally threaded cylindrical stems 70 formed in the contact plate. A frusto-conically shaped pressure plate 80, having a peripheral portion with an outwardly facing conical-surface 82 and a flat portion 84, is mounted over the main hub adjacent to the contact plate. It is most preferred that the peripheral conical portion of the pressure plate should be hollow, with radially aligned ribs 85 formed in the pressure plate to form a triangular leg of the conical portion for support, preferably aligned with the centrifugal force levers. The conical pressure plate has a central opening provided with radially inward facing splines adapted to engage the corresponding splines on the main hub. A friction lining having an annular frusto-conical shape is adhesively bonded to the conical surface of the pressure plate, adapted to smoothly engage the inner friction surface 90 of the frusto-conically shaped drum. The drum includes an interior flange 91 forming a central opening in the drum, which in combination with the front flange of the main hub, retains the races 92 of the angle bearing 94, permitting rotational movement between the frusto-conical drum and the main hub.

In order to provide an output connector of the torque transmitted from the pressure plate to the drum of the centrifugal cone clutch, a sprocket 100, having typically from 9 to 21 splines 102 at the front end of the sprocket 104 is secured to the face of the frusto-conical drum. Preferably a plurality of screws 106 are inserted through holes 107 in the sprocket, and threadably engaged in the holes 109 in the face of the drum, symmetrically arranged around the circular central opening 108 of the frusto-conical drum.

Input power is supplied to the clutch by an engine with a power takeoff shaft, which is secured for transmission of the rotational power to the main hub particularly by the keyway, and the assembly of the hub, support member and ground nut. The contact plate and pressure plate also rotate in unison with splined main hub and power shaft, and as the centrifugal force on the centrifugal force levers becomes sufficient, the drive portion of the centrifugal force levers presses against the contact plate, which in turn biases the frictional lining of the conical pressure plate into engagement with the annular inner friction surface of the drum. The sprocket on the drum serves as an output connector for the clutch, suitable for use with a chain drive as is typically used in a go-cart.

The speed of engagement at which the centrifugal force levers overcome the restraining force exerted by the compression springs on the contact plate may be adjusted by turning the stall speed adjustment screws, to vary the degree of compression of the springs.

In the foregoing description, it has been demonstrated that the centrifugal cone clutch of the invention provides a simplified, lightweight structure, with a reduced frictional surface not requiring an array of plates and discs such as a re commonly found in conventional clutches. The centrifugal force levers operate to force the pressure plate into engagement with the pressure drum at a rotational speed which may be fixed by the stall speed adjustment screws. The clutch may therefore be constructed more efficiently, compactly and to be of a lighter weight than conventional clutch designs.

Although in the foregoing description, one preferred embodiment has been described, it should be obvious that one skilled in the art could make numerous modifications to the invention. For example, the contact plate and pressure plate may be formed as one integral piece, and it would be possible to arrange the centrifugal force levers to apply their drive force on the pressure drum, if the direction of the conical surfaces of the pressure plate and pressure drum were to be inverted, or if, for example, the centrifugal force levers were to be placed adjacent to the pressure drum. Other mechanical inversions of the operative parts of the centrifugal cone clutch should also be possible.

Therefore, although one specific embodiment of the invention has been described and illustrated, it is clear that it is susceptible to numerous modifications and embodiments within the ability of those skilled in the art and without the exercise of the inventive faculty. Thus, it should be understood that various changes in form, detail and application of the present application may be made without departing from the spirit and scope of the invention.

I claim:

1. A centrifugal friction clutch for transmission of torque from a rotating input connector means for supplying rotational power to an output connector means for receiving said rotational power, and having frictional surfaces adapted to be engaged at a predetermined engagement speed of rotation of said input connector means, comprising:
   (a) a pressure plate means having a peripheral frusto-conical pressure application surface;
   (b) a pressure drum having a frusto-conical cavity having a peripheral pressure receiving surface adapted to frictionally engage said pressure application surface;
   (c) a centrifugal force lever support member having a plurality of apertures therein and operatively engaged with said input connector means;
   (d) means for applying an adjustable biasing force on said support member towards said pressure plate means comprising a plurality of threaded apertures in said pressure plate means aligned with said support member apertures, a plurality of threaded members engaging said threaded apertures, and a plurality of compression springs, each of which extends between one of said threaded members and said support member;
   (e) a plurality of centrifugal force levers symmetrically disposed on an pivotally attached to said support member, each of said levers having a radius portion, a weighted portion and a pivotal point of attachment to said support member, each radius portion being adapted to bias said pressure application surface towards said pressure drum pressure receiving surface due to centrifugal force exerted on said levers during rotation of said support member; and
   (f) said pressure plate means comprising a flat contact plate member including said threaded apertures, adjacent said centrifugal force levers, and a pressure plate member adjacent said contact plate member having a flat central portion and a peripheral portion, said frusto-conical pressure application surface being formed in said peripheral portion of said pressure plate member, whereby said biasing from said centrifugal force levers is transmitted to said pressure plate member through said contact plate member.

2. The clutch of claim 1, wherein said input connector means comprises a power takeoff shaft and a hub mounted over said shaft, said hub having a plurality of exterior splines, and each of said contact plate member and said pressure plate member having a plurality of interior splines engaging said hub splines.

3. A centrifugal friction clutch for transmission of torque from a rotating power takeoff shaft having a threaded end portion for supplying rotational power to an output connector means for receiving said rotational power, and having frictional surfaces adapted to be engaged at a predetermined engagement speed of rotation of said input connector means, comprising:
   (a) a pressure plate means having a peripheral frusto-conical pressure application surface;
   (b) a pressure drum having a frusto-conical cavity having a peripheral pressure receiving surface adapted to frictionally engage said pressure application surface;
   (c) a centrifugal force lever support member operatively engaged with said power takeoff shaft, said support member being mounted on said shaft by a threaded nut threadably secured to said threaded end portion of said shaft; and
   (d) a plurality of centrifugal force levers symmetrically disposed on and pivotally attached to said support member, each of said lever having a radius portion, a weighted portion and a pivotal point of attachment to said support member, each radius portion being adapted to bias said pressure application surface towards said pressure drum pressure receiving surface due to centrifugal force exerted on said levers during rotation of said support member.

4. A centrifugal friction clutch assembly for use in combination with a rotating input connector means and an output connector means, said clutch comprising:
   (a) a pressure plate means having a contact plate portion and a pressure plate portion having an external frusto-conically shaped friction engagement surface extending from the periphery of said pressure plate portion;
   (b) a pressure drum having an internal peripheral surface corresponding to and adapted to engage said pressure plate friction engagement surface;
   (c) a centrifugal force lever support member operatively connected to said pressure drum to allow rotational movement between said support member and said pressure drum, said support member including a plurality of apertures therethrough;
   (d) means for biasing said pressure plate portion against said pressure drum comprising a plurality of threaded stems projecting axially from said contact plate portion through said apertures, a plurality of threaded members engaging said threaded stems, and a plurality of compression springs, each of which extends between one of said threaded members and said support member;
   (e) a plurality of centrifugal force levers symmetrically disposed on said support member, each of said levers having a drive portion and a weight portion, said levers being pivotally attached to said support member such that said drive portion biases said friction engagement surface into engagement with said pressure drum internal peripheral surface above a preset speed of rotation of said input connector means; and (f) said pressure plate means comprising a flat contact plate member including said stems, adjacent said centrifugal force levers, and a pressure plate member adjacent said contact plate member having a flat central portion and a peripheral portion, said frusto-conical pressure application surface being formed in said peripheral portion of said pressure plate member, whereby said biasing from said centrifugal force levers is transmitted to said pressure plate member through said contact plate member.

5. A centrifugal friction clutch assembly for use in combination with a rotating power takeoff shaft having a threaded end portion, and an output connector means, said clutch comprising:

(a) a pressure plate means having a contact plate portion and a pressure plate portion having an external frusto-conically shaped friction engagement surface extending from the periphery of said pressure plate portion;

(b) a pressure drum having an internal peripheral surface corresponding to and adapted to engage said pressure plate friction engagement surface;

(c) a centrifugal force lever support member operatively connected to said pressure drum to allow rotational movement between said support member and said pressure drum, said support member including a plurality of apertures therethrough, said power takeoff shaft having a threaded end portion, and said support member being mounted on said shaft by a threaded nut threadably secured to said threaded end portion of said shaft;

(d) means for biasing said pressure plate portion against said pressure drum comprising a plurality of threaded stems projecting axially from said contact plate portion through said apertures, a plurality of threaded members engaging said threaded stems, and a plurality of compression springs, each of which extends between one of said threaded members and said support member; and (e) a plurality of centrifugal force levers symmetrically disposed on said support member, each of said levers having a drive portion and a weight portion, said levers being pivotally attached to said support member such that said drive portion biases said friction engagement surface into engagement with said pressure drum internal peripheral surface above a preset speed of rotation of said power takeoff shaft.

6. A centrifugal friction clutch assembly for use in combination with a rotating power takeoff shaft and an output connector means, said clutch comprising:

(a) a pressure plate means having a contact plate portion and a pressure plate portion having an external frusto-conically shaped friction engagement surface extending from the periphery of said pressure plate portion;

(b) a pressure drum having an internal peripheral surface corresponding to and adapted to engage said pressure plate friction engagement surface;

(c) a centrifugal force lever support member operatively connected to said pressure drum to allow rotational movement between said support member and said pressure drum, said support member including a plurality of apertures therethrough;

(d) means for biasing said pressure plate portion against said pressure drum comprising a plurality of threaded stems projecting axially from said contact plate portion through said apertures, a plurality of threaded members engaging said threaded stems, and a plurality of compression springs, each of which extends between one of said threaded members and said support member;

(e) a plurality of centrifugal force levers symmetrically disposed on said support member, each of said levers having a drive portion and a weight portion, said levers being pivotally attached to said support member such that said drive portion biases said friction engagement surface into engagement with said pressure drum internal peripheral surface above a preset speed of rotation of said power takeoff shaft; and (f) a hub mounted over said power takeoff shaft, said hub having a plurality of exterior splines, and wherein said pressure plate means has a plurality of interior splines engaging said hub splines.

7. A centrifugal friction clutch assembly for use in combination with a rotating input connector means and an output connector means, said clutch comprising:

(a) a pressure plate means having a contact plate portion and a pressure plate portion having an external frusto-conically shaped friction engagement surface extending from the periphery of said pressure plate portion;

(b) a pressure drum having an internal peripheral surface corresponding to and adapted to engage said pressure plate friction engagement surface;

(c) a centrifugal force lever support member operatively connected to said pressure drum to allow rotational movement between said support member and said pressure drum, said support member including a plurality of apertures therethrough;

(d) means for biasing said pressure plate portion against said pressure drum comprising a plurality of threaded stems projecting axially from said contact plate portion through said apertures, a plurality of threaded members engaging said threaded stems, and a plurality of compression springs, each of which extends between one of said threaded members and said support member;

(e) a plurality of centrifugal force levers symmetrically disposed on said support member, each of said levers having a drive portion and a weight portion, said levers being pivotally attached to said support member such that said drive portion biases said friction engagement surface into engagement with said pressure drum internal peripheral surface above a preset speed of rotation of said input connector means;

(f) said pressure plate means comprising a flat contact plate member including said stems, adjacent said centrifugal force levers, and a pressure plate member adjacent said contact plate member having a flat central portion and a peripheral portion, said frusto-conical pressure application surface being formed in said peripheral portion of said pressure plate member, whereby said biasing from said centrifugal force levers is transmitted to said pressure plate member through said contact plate member; and (g) input connector means comprising a power takeoff shaft and a hub mounted over said shaft, said hub having a plurality of exterior splines, and each of said contact plate member and said pressure plate member having a plurality of interior splines engaging said hub splines.

* * * * *